United States Patent [19]

LeBlanc

[11] 4,318,805
[45] Mar. 9, 1982

[54] SCREENING APPARATUS

[75] Inventor: Peter E. LeBlanc, Norton, Mass.

[73] Assignee: Bird Machine Company, Inc., South Walpole, Mass.

[21] Appl. No.: 191,827

[22] Filed: Sep. 29, 1980

[51] Int. Cl.³ ............................................. B07B 1/20
[52] U.S. Cl. ..................................... 209/273; 209/286
[58] Field of Search ............... 209/273, 270, 283, 286, 209/306, 407; 210/415

[56] References Cited

U.S. PATENT DOCUMENTS

| 811,930 | 2/1906 | Kihlgren | 209/273 |
| 983,784 | 2/1911 | Tharaldsen | 209/273 |
| 1,696,354 | 12/1928 | Haug | 209/270 |
| 1,926,546 | 9/1933 | Lampen | 209/273 |
| 2,833,413 | 5/1958 | Fontein | 209/362 |
| 2,955,246 | 8/1961 | van Tittelboom | 209/362 |
| 2,975,899 | 3/1961 | Cannon et al. | 209/273 |
| 3,255,074 | 6/1966 | Salomon | 162/338 |
| 3,363,759 | 1/1968 | Clarke-Pounder | 209/273 |
| 3,680,696 | 8/1972 | Morin | 209/306 X |

FOREIGN PATENT DOCUMENTS 572547 9/1977 U.S.S.R. ............................ 209/273

Primary Examiner—Ralph J. Hill
Attorney, Agent, or Firm—Edgar H. Kent

[57] ABSTRACT

Apparatus for screening pulp slurry in an annular screening zone in the space between a screen of circular cross-section and a closed surface drum carrying pulse creating means, the screen and drum being coaxially mounted for relative rotation about their common axis, is characterized by means for feeding the slurry providing at least one inlet to the space extending substantially the full axial length of the screening zone, and means for removing from the space rejects not passing through the screen having at least one rejects outlet from the space extending substantially the full axial length of the screening zone.

19 Claims, 5 Drawing Figures

FIG.4
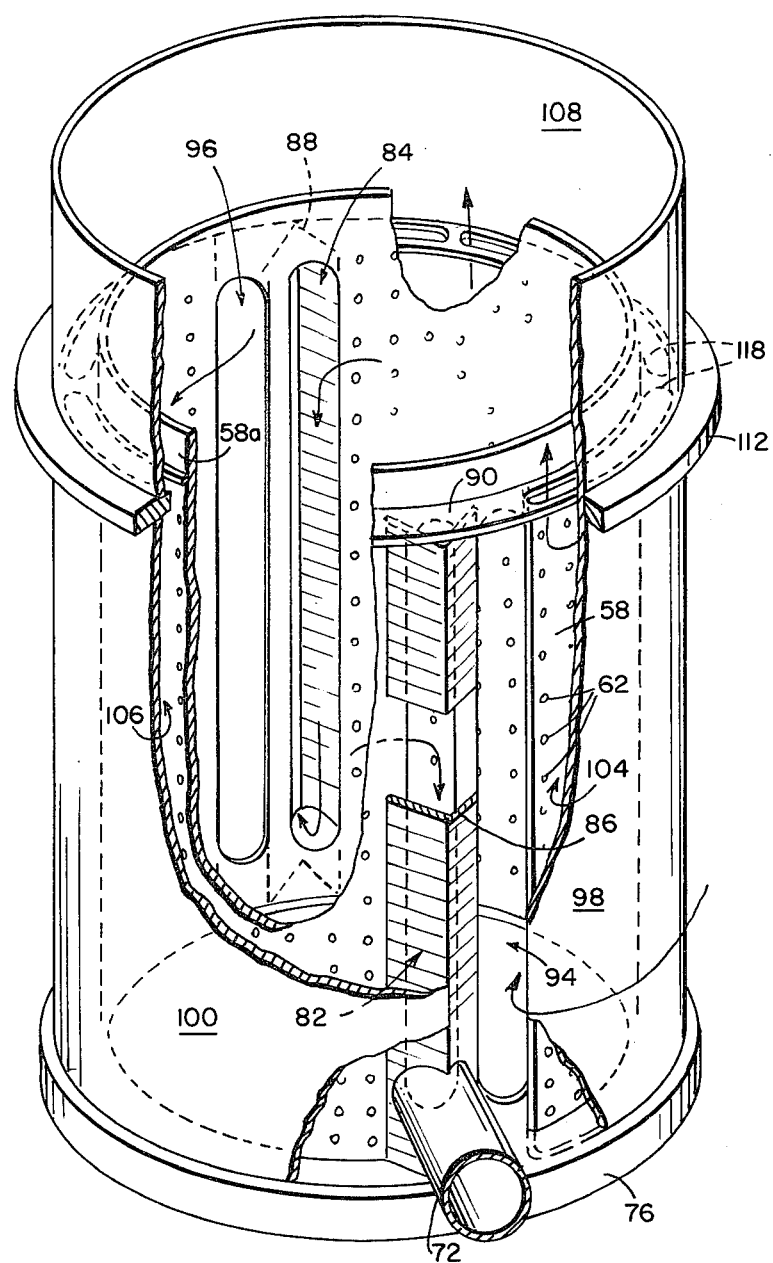
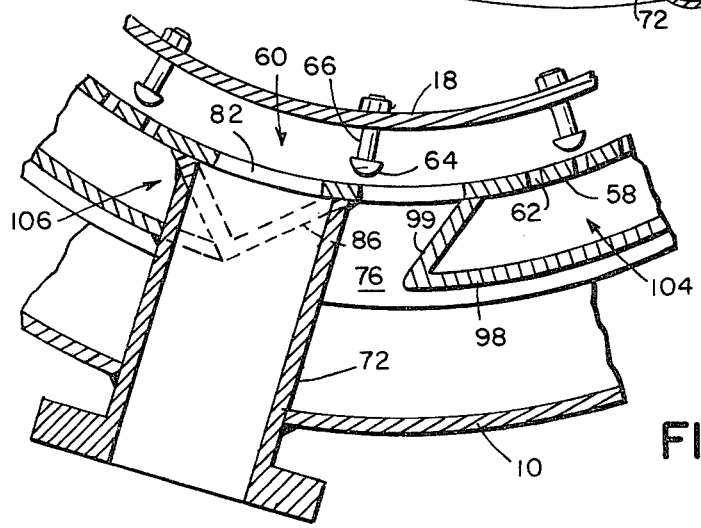
FIG. 5

SCREENING APPARATUS

BACKGROUND OF THE INVENTION

1. Field of the Invention

This invention concerns screening apparatus for separating on a size basis solid components of a pulp slurry. More particularly, the invention concerns such apparatus suitable for use as a "headbox screen," for screening papermaking fiber slurry immediately before it is distributed by the headbox to a papermaking machine.

2. Description of the Prior Art

Screening of paper fiber slurry immediately before it is applied to the papermaking machine requires screening apparatus with a high throughput of accepts to handle the large volume of flow required by a modern high speed paper machine, this with a low pressure drop, generally not over 6 p.s.i. This should be accompanied by a low reject rate, as the purposes of the headbox screen are primarily "de-floccing" of the stock and to eliminate the few undesirables or "junk" that may have escaped the pre-cleaning stages, these having generally sorted out most of the non-desirable fibers and junk.

In the past, screening apparatus of the so-called "foil" type such as shown in U.S. Pat. No. 2,975,899, wherein an open or "cage" rotor carries screen length foil bars that produce the requisite pulsation for effective screening, have been found most satisfactorily to possess these characteristics, along with desirably low horsepower requirements, and have been generally used for the purpose. However, they have a drawback in that the foils passing the screen outlet area produce large regular pulses that are transmitted through the stock as it passes to the papermaking machine. These pulses, added to those from the preceding fan pump which are often transmitted through the screen, have been an increasing cause for concern to paper manufacturers, because they cause wave or ripple defects in the forming paper.

Experiments have shown that screening apparatus having a drum rotor with a bumped surface providing the pulsing, as disclosed in U.S. Pat. No. 3,363,759, applied as a headbox screen, does not generate pulses that are transmitted to any harmful extent to the headbox and furthermore is effective in suppressing further transmission of pulses from the fan pump. However, such apparatus is designed primarily as a "sorter," for screening in the pulp mill fiber slurry of relatively high consistency compared to that of papermaking furnish. Its commercial embodiments do not have the high throughput capacity at low pressure drop with low rejects to accepts ratio desirable in a headbox screen.

SUMMARY OF THE INVENTION

The object of this invention is to provide screening apparatus with a drum rotor which has all the above-mentioned advantages of the foil type rotor screen for use as a headbox screen, yet is at least the equivalent of the bumped surface drum rotor screen mentioned above in preventing harmful pulses from reaching the stock applied to the paper machine.

In attaining this object, the invention provides screening apparatus which is similar to that disclosed in aforesaid U.S. Pat. No. 3,363,759 in the respects that it has a circular cross-section screen and drum rotor having pulse creating means on its surface, coaxially mounted for relative rotation about the screen axis with the pulse creating means located between them, feed means for feeding slurry to the space between screen and drum and means for removing rejects from that space and for removing the accept slurry passing through the screen. However, the feed, rejects removal and flow path arrangement of the new screen depart radically from the feed at one screen end, reject removal at the other end and intervening spiral flow about the axis in the patented arrangement. In the new screen, the feed means discharges the slurry to the side of the screening zone between rotor and screen substantially uniformly for its full axial length, and the rejects removal means has an inlet extending substantially the full length of the screening zone.

Thus, in the new screen the flow of slurry is circumferentially around the screen axis for less than 360° between inlet and rejects outlet, with only such slurry as does not flow through the screen or rejects outlet recirculating. There may be a single slurry inlet and rejects outlet spaced nearly 360° apart about the screen-rotor axis or, as in the preferred embodiment herein illustrated, two such inlets and outlets spaced somewhat less than 180° apart, or even more pairs of inlets and outlets.

The conception of this new arrangement arose in part from a belief, now verified, that the long spiral screening path of the apparatus disclosed in aforesaid U.S. Pat. No. 3,363,759 is not only not required for adequate headbox screening but is in fact deleterious to the objectives of such screening, in that it concentrates the slurry toward the rejects end, providing a higher reject rate (e.g., 20%) than is desirable for a headbox screen (e.g., 5%) and similarly lower debris removal efficiency, higher rejects to accepts ratio, and much lower throughput and higher horsepower requirements. For example, a typical commercial embodiment of the apparatus of said U.S. Pat. No. 3,363,759 has a 20 inch (510 m.m.) diameter screen and the slurry makes 5 helical turns about the screen axis for a screening path length of about 26 feet (7910 m.m.). In contrast, the screening path length in apparatus according to the invention does not exceed 10 feet (3050 m.m.) and is preferably about 3 to 4 feet (910–1220 m.m.). The axial length screening zone feed and rejects removal make this short screening path possible, as end feed to a screen of requisite length and diameter inherently, due to the action of the rotor, results in a spiral flow path of several turns about the axis and a longer path than has now been determined to be desirable for headbox screening.

Other significant departures from the apparatus disclosed in said U.S. Pat. No. 3,363,759 include new pulse creating means on the rotor which make it possible to enlarge the spacing between rotor and screen, thus contributing to the short path length by adding capacity more suitable to the relatively dilute slurry to be treated. Such pulse creating means has the form of pins projecting from the rotor, with enlarged heads having close clearance from the screen, the heads providing the pulses while the pins offer little resistance to flow. While the bumped rotor of U.S. Pat. No. 3,363,759 requires for fully effective pulsing and requisite low pressure drop a maximum spacing of rotor body from screen of about ¾ths inch (19 m.m.), the new pulse creating means provides adequate pulsing at increased rotor-screen spacings of 2–3 times this amount as is desirable, or even greater spacing, the new rotor being fully equivalent to that of the patent in not producing or transmitting harmful pulses.

Tests of screen apparatus according to the invention against commercial embodiments of the apparatus disclosed in aforesaid U.S. Pat. Nos. 2,975,899 ("Screen A") and 3,363,759 ("Screen B") showed that the new screen had the following advantages for headbox screen use when applied to screening slurry of 0.5% concentration such as is supplied to a headbox and using conventional 0.062 inch (1.59 m.m.) apertured screen of 12% open area:

- greater flow rate than both Screens A and B measured in gallons per minute ("GPM") per square foot of screen area at 6 p.s.i. (0.42 kg/cm$^2$) pressure drop;
- much less concentration of the slurry and lower rejects by weight than Screen B, about the same as Screen A;
- several times less horsepower required per GPM flow than Screen B, about the same as Screen A;
- at least the superiority of Screen B over Screen A in non-generation of harmful pulses and suppression of pregenerated pulses;
- debris removal superior to Screen A (due to higher stock velocities) and as good as Screen B.

BRIEF DESCRIPTION OF THE DRAWINGS

In the drawings:

FIG. 4 is a side elevation view, broken away in part, of the screen with other components assembled thereto as a unitary subassembly;

FIG. 5 is an enlarged detail transverse cross-section view of a portion of the apparatus.

DESCRIPTION OF THE PREFERRED EMBODIMENT

Figure 1:
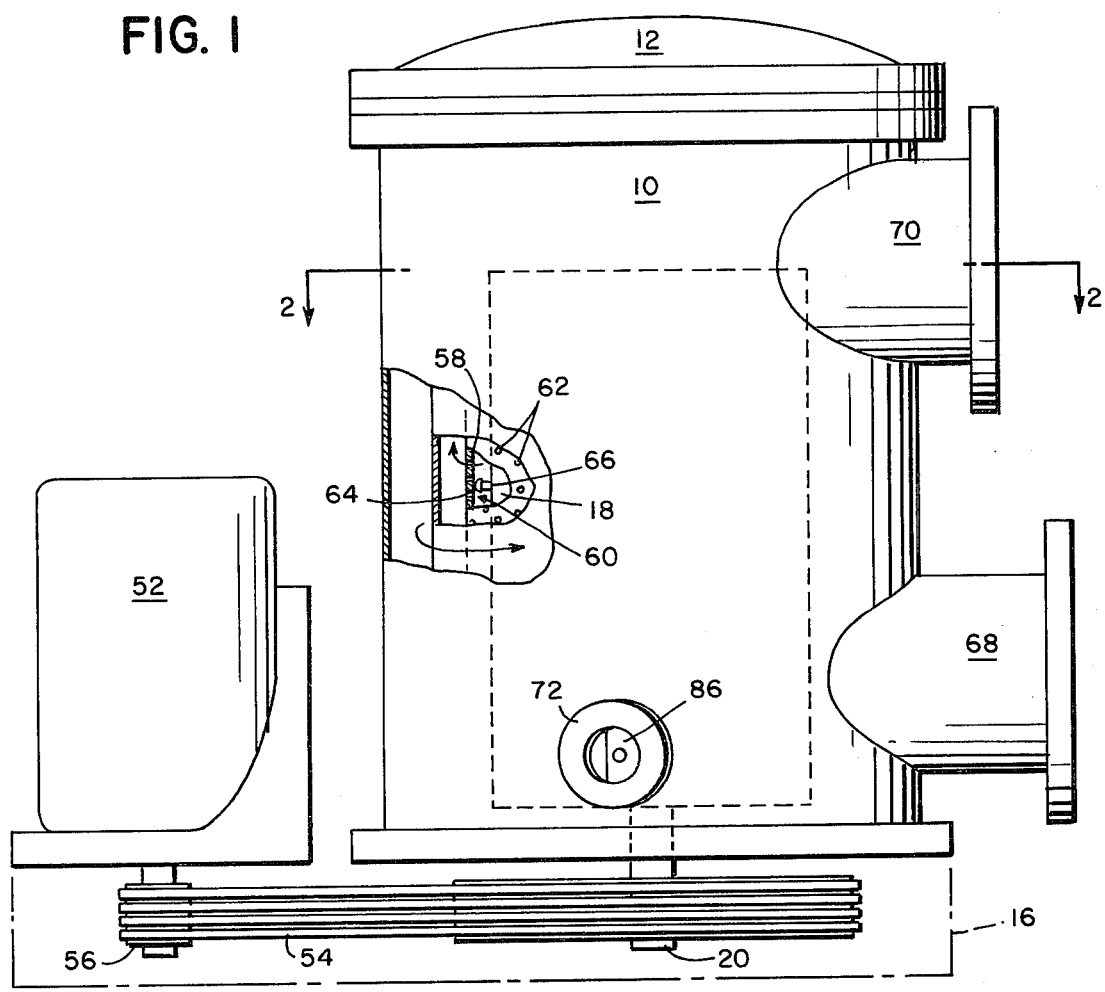
FIG. 1 is a side elevation view, partly broken away, of screening apparatus according to the invention.

Referring to the drawings, the screening apparatus has a casing 10 provided with a removable cover 12 and a base 14 seated on a support indicated by dash line 16 in FIG. 1. A cylindrical closed drum or rotor 18 is co-axially mounted on the upper part of a vertical shaft 20 (see FIG. 3). Shaft 20 extends through a thrust bearing assembly 22 seated in base 14 and is provided with a sealing sleeve 24 with flinger associated with a bearing assembly. A drive sheave 26 has its hub fastened to the end portion of shaft 20 below base 14 by a wedging bushing 28.

A cylindrical shaft enclosure 30 has its lower end fixed to base 14. A second bearing assembly 32 fixed to interior ledge 34 on enclosure 30 receives the shaft rotatably therethrough. Shaft 20 is provided with a sealing sleeve 36 with flinger fixed thereto immediately above thrust bearing assembly 32, and with another sealing sleeve 38 fixed thereto immediately above sleeve 36. The shaft and sleeve 38 extend rotatably through an inverted cup-shaped central portion of a cover 40 of enclosure 30, and a sealing gland 42 therein. The hub 44 of drum 18, which is fixed to the drum end wall 46 and a further supporting wall 48 immediately below it, is fixed to the top of the shaft by a key, and the parts assembled to the shaft above bearing assembly 32 are held in place under some compression by a lock nut 50 on the threaded upper end of the shaft 20.

Rotor 18, which has clearance from base 14 and other fixed parts, is rotated by shaft 20, which in turn is rotated by motor 52 (FIG. 1) mounted on support 16 through belts 54 connecting sheave 56 on the motor drive shaft with sheave 26 on shaft 20.

Figure 2:
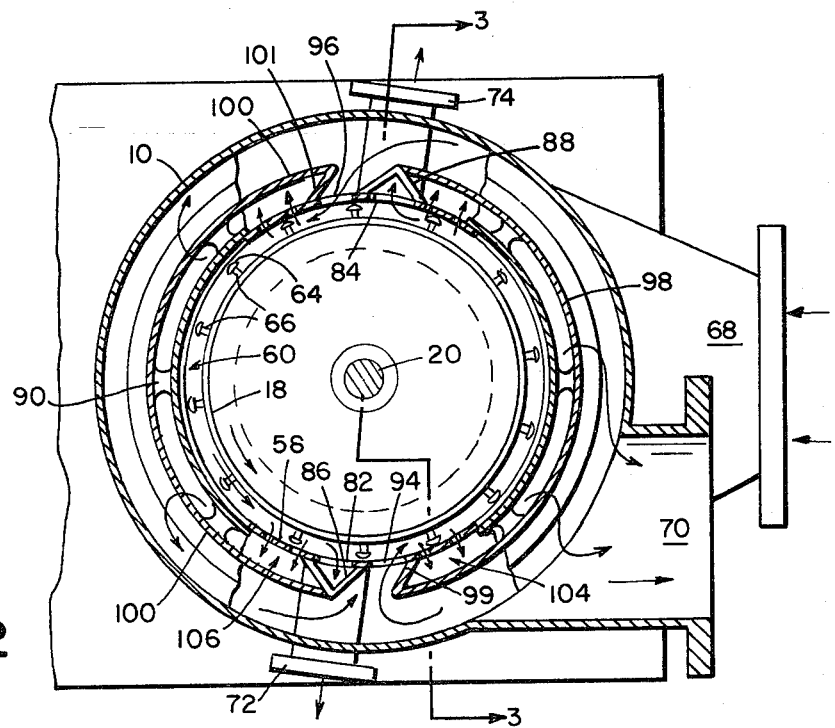
FIG. 2 is a top plan view taken on a cross-section on line 2—2 of FIG. 1, looking in the direction of the arrows, with parts broken away to show underlying construction.
Figure 3:
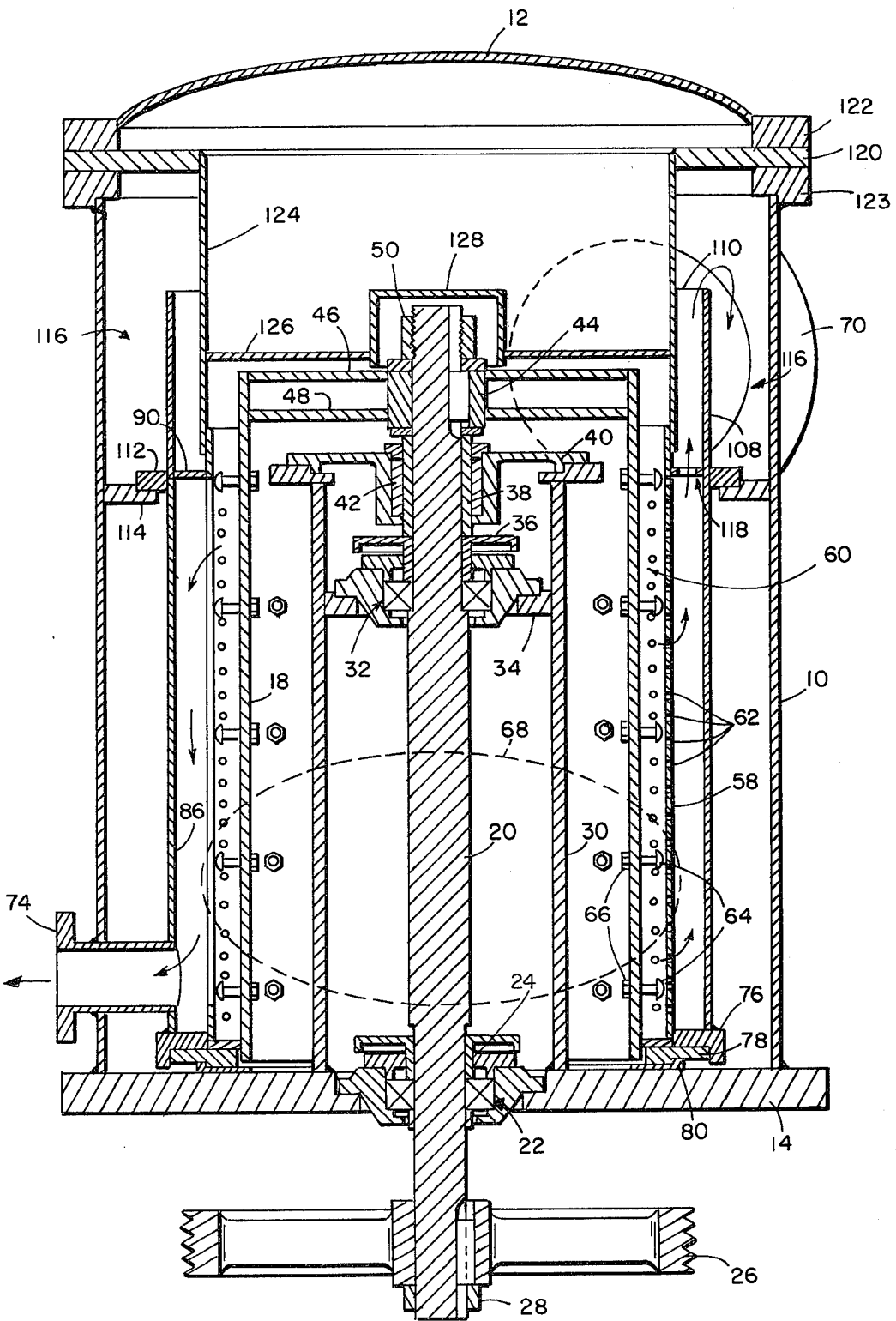
FIG. 3 is a vertical cross-section view taken on line 3—3 of FIG. 2, looking in the direction of the arrows.

A stationary cylindrical screen 58 surrounds drum 18 co-axially and defines with the drum 18 an intervening screening passage 60 (see FIGS. 2 and 3). Screen 58 is provided with openings 62 for the outward passage of accepted stock from the screening passage, which may desirably be, as is conventional for headbox screening, 1/16th inch (1.59 m.m.) diameter holes spaced to provide 12 percent open area. Drum 18 is provided with pulse creating means in passage 60 in the form of generally hemispherical buttons 64 secured to the ends of pins 66 attached to the drum and which may be, as shown, the shanks of bolts threaded through holes in the drum with locknuts on the inner surface of the drum.

Unconventionally, according to this invention, as best seen in FIG. 4, screen 58 is provided with two pairs of closely spaced slots extending substantially from top to bottom of screening passage 60, the slot pairs being spaced apart somewhat less than 180° about the screen axis, and is combined with surrounding structure, as a sub-assembly shown in FIG. 4, to form one slot of each pair into a pulp slurry inlet to passage 60 and the other slot of the pair into a rejects outlet therefrom, with an intervening chamber for receiving accepted stock passing the screen. Thus the apparatus is made to process in two halves, each treated in diametrically opposite halves of the apparatus, a single inflow of slurry to inlet pipe 68 (FIG. 1) and to provide a single outflow of accepted stock through accepts outlet pipe 70 but two outflows of rejects through diametrically opposite reject outlets 72 and 74 (FIG. 2).

Describing now in more detail the sub-assembly shown in FIG. 4 and also in other Figures, the sub-assembly has an annular base 76 which, as shown in FIG. 3, is L-shaped in cross-section, has the bottom end of screen 58 welded to its inside edge and is in turn secured to the upper one of two relatively inverted, nested annular members of L-shaped cross-section 78, 80 secured together and to apparatus base 14 when the screen is assembled. Two opposite reject outlet slots 82, 84 in screen 58, extending approximately from top to bottom of screening passage 60, constitute inlets to opposite rejects chambers formed by V-shaped channel members 86, 88 each having its side edges secured to the outer face of screen 58, and having its respective ends secured to base 76 and a flange 90 projecting laterally from the outer face of screen 58 above the screening passage. Members 86, 88 thus form a closed chamber about respective slots 82, 84 except for the openings into respective reject outlets 72 and 74.

One side of channel members 86, 88 is secured to screen 58 at one side edge of opposite slurry inlet slots 94, 96, respectively, through screen 58 to screening passage 60, these being of approximately the same length and width as slots 82, 84 and adjacent thereto (see FIGS. 2, 4, 5). Two accepts chamber wall members 98, 100, secured at their bottom edge to base 76, each have a reversely bent end portion 99, 101, respectively, secured at the opposite side edge of inlet slots 94, 96, respectively, from members 86, 88, and form, with the sidewall of member 86 or 88, tangentially directed inlet channels to slots 94, 96, respectively. The other end of members 98, 100 is secured to the outer end of respective members 86, 88 to form two opposite accepts chambers 104, 106 on the outside of screening passage 60, each being approximately 180° in angular extent minus the angular extent occupied by one set of inlet and outlet slots.

The reversely bent end portions 99, 101 of members 98, 100 are secured at their tops to the underside of flange 90, and above this members 98, 100 are integral with hollow cylinder 108 secured at its inner surface to the outer edge of flange 90 and extending above it to form the outer edge of an overflow channel 110 (FIG. 3) from both accepts chambers 104, 106. An annular flange 112 (FIG. 3) on the outside of cylinder 108 seats on annular ledge 114 projecting inwardly from casing 10 to form the bottom of an accepts gutter 116 surrounding cylinder 108 above them, from which the accepts exit through outlet pipe 70. Elongated openings 118 are provided in flange 90 where it overlies chambers 104, 106 to allow flow of accepts upward therethrough into overflow channel 110.

A ring 120 (FIG. 3), clamped between rim 122 of cover 12 and a top flange 123 on casing 10, has a cylindrical sleeve 124 secured to its inner edge with a diameter such as to fit closely over the outer periphery of an unapertured extension 58a of screen 58, thereby forming the inner wall of channel 110 and gutter 116, with ring 120 closing the top of the gutter. Sleeve 124 has a transverse wall 126 with an inverted cup 128 in its central portion receiving the upper end of shaft 20, sleeve 124 and wall 126 serving as a closure for the upper end of screening passage 60 which, however, is not functional above the perforated portion of screen 58. By removing cover 12 and pulling off ring 120 and sleeve 124, end access to the screening passage 60 may be had. Also, rotor 18 may be removed by unscrewing nut 50 and sliding rotor hub 44 off its keyed connection to shaft 20.

In operation, the feed slurry supplied to inlet 68 splits in two halves which flow respectively clockwise to the inlet channel to slot 94 and counterclockwise to the inlet channel to slot 96 in a flow passage provided between wall 98 of accepts chamber 104 and casing 10. Most of this flow passes inwardly through the inlet channels and slots tangentially into screening passages 60, where the rotor is rotating counterclockwise in the drawings, as indicated by arrows in FIG. 2. Slurry which does not enter the first inlet it encounters continues in the flow passage between the casing 10 and wall 100 of the other accepts chamber 106 until it either reaches the other inlet slot or is backed up by feed slurry flowing in the opposite direction. In screening compartment 60 the slurry flows from slot 94 counterclockwise past screening accepts compartment 104, and from slot 96 counterclockwise past screening accepts compartment 106 while being subjected to the pulsing action of buttons 64, with rejects exiting through outlet slots 84 and 82, respectively, to piping (not shown) connected to rejects outlets 72 and 74. Any slurry passing a rejects outlet recirculates in the passage 60 past the following slurry inlet and accepts chamber. The accepts passing the screen flow upwardly in accepts compartments 104, 106 through openings 118 in flange 90, through and out channel 110 into gutter 116 and out outlet 70 to connected piping (not shown).

In maintaining proper flow, it is desirable that the cross-sectional area of the slurry inlet 68 be considerably greater than the longitudinal cross-sectional area of screening passage 60, such as two times the cross-sectional area of screening passage 60 multiplied by the number of inlets to the screening compartment (two slots 94, 96 in the illustrated embodiment).

The preferred embodiment shown has approximately the following dimensions for parts mentioned: rotor drum 18 outer diameter, 32 inches (813 m.m.); screen 58 inner diameter, 36.6 inches (930 m.m.); slots 82, 84, 94, 96, 38.25 inches (972 m.m.) long by 3.75 inches (95 m.m.) wide except at rounded ends; accepts chambers 104, 106, 2.2 inches (56 m.m. wide) by 147° angular extent; casing 10 inner diameter 54 inches (1372 m.m.), height to center of cover 90 inches (2286 m.m.).

Thus a screening path length past each accepts chamber is provided about 2 inches (50.4 m.m.) below the upper limit of 4 feet (1220 m.m.) of the most desirable range of such length set forth earlier herein. Similar results can be achieved with two screens having but one of the two pairs of inlet and outlet slots and a smaller diameter, such that half the slurry fed to the single inlet slot of each screen flows nearly 360° about the screen axis to the outlet slot in a path of similar length. This would multiply the cost of the hardware needed to process the large flows which normally must be handled by headbox screens. However, for smaller flows, the single inlet and outlet slot modification may be better suited.

The apparatus with the given dimensions is designed for a capacity of up to 10,000 g.p.m. (631 liters/sec.) applied to slurry of normal headbox consistency. If a single screen apparatus of even greater capacity is desired while maintaining screen path length within the most desirable range, a screen of larger diameter could be provided with three or more inlet slots and corresponding rejects slots and outlets.

In the illustrated embodiment, the screening passage has a width of about 2.3 inches (58 m.m.), as the above-given dimensions indicate. The pulsing hemispherical buttons 64 have a radius of $\frac{7}{8}$ in. (22 m.m.) with a close clearance from the screen and there may be 80–100 of the buttons and pins 66 distributed with about equal spacing over the drum surface. The rotor drum 18 may be normally driven at about 330 r.p.m., this being about half the normal angular velocity of the rotor drum in apparatus constructed according to U.S. Pat. No. 3,363,759 aforesaid. However, it is desirable in the apparatus according to the present invention that the angular velocity of the rotor somewhat exceed (e.g., by 25%–50%) the velocity of the incoming slurry at inlet 68. Provision may be made for varying rotor speed either by a variable speed motor or by varying sheave 56 diameter.

While the rotor is normally most desirably rotated in the direction of flow in screening passage 60, it can be rotated in the opposite direction. This may increase the screening throughput somewhat but also greatly increases horsepower requirements at lower efficiency.

Also, it is recognized that it would be possible to redesign the apparatus so that the screen would be rotated and the drum would be stationary, as this is know to produce similar screening action to that of a stationary screen with rotating pulse makers. For example, the screen could be rotated and interchanged in position with a fixed drum having the pulse creating devices on its inner face toward the screen and containing the slurry inlet and rejects outlet slots. In such an arrangement, separate accept chambers would not be needed and would be replaced by a single discharge system from the inside of the screen. While such a revised arrangement might operate similarly, it is believed it would not be as effective and the arrangement shown is preferred. Positioning a rotating rotor drum inside a stationary outward flow screen rather than outside a stationary inward flow screen is preferred for several reasons including less horsepower needed to rotate the smaller drum.

The illustrated embodiment is designed for mounting on a vertical axis, as is preferred but not essential. It should be pointed out, that the arrangement shown in which the accepts discharge axially from the accepts chambers 104, 106, has been found to be a desirable feature, contributing to the efficiency of screening and pulse reduction at these compartments.

I claim:

1. In a screening apparatus for separating on a size basis solid components of a pulp slurry which comprises a screen of circular cross-section apertured to form an annular screening zone between its ends, a substantially closed surfaced drum having an axial length at least substantially equal to the axial length of said screening zone of said screen and having pulse creating means on one surface thereof, mounting means coaxially mounting said screen and drum for relative rotation about their common axis with said pulse creating means located between said drum and said screen, feed means for feeding slurry to the space between said screen and said drum rejects removal means for removing from said space slurry not passing through said screen, accepts removal means for removing slurry passing through said screen, and a casing surrounding the foregoing having outlet piping comprised respectively in said rejects and accepts removal means and otherwise sealed to prevent escape of slurry therefrom, said mounting means being constructed and arranged to form said space as a closed flow path for the slurry in said casing from said feed means to said removal means;

the improvement wherein said feed means comprises inlet means for admitting the feed slurry to said space having at least one inlet to said space extending substantially the full axial length of said screening zone of said screen, and said rejects removal means comprises rejects receiving means providing at least one rejects outlet thereto from said space extending at least substantially the full axial length of said screening zone of said screen.

2. Screening apparatus according to claim 1 wherein each said inlet has a said rejects outlet associated therewith to receive slurry not passing through the screen while flowing from said inlet to said associated outlet in a flow path between about 3 feet and 10 feet in length.

3. Screening apparatus according to claim 2 wherein said flow path is between about 3 feet and 4 feet in length.

4. Screening apparatus according to claim 1 wherein said screen is stationary and said drum is rotatable about said common axis.

5. Screening apparatus according to claim 1 wherein said feed means includes at least two of said feed admitting inlets and said reject receiving means includes at least two of said rejects outlets thereto from said space, said inlets and said outlets being spaced in alternation circumferentially of said screen.

6. Screening appartus according to claim 5 wherein each said inlet is further spaced from the said outlet following it than from the outlet preceding it in the direction of relative rotation.

7. Screening apparatus according to claim 5 wherein said reject receiving means includes a separate receiving chamber for the rejects flowing through each said outlet.

8. Screening apparatus according to claim 1 wherein said feed means includes means for supplying the feed slurry to said inlet means in a flow having a cross-sectional area approximately equal to two times the cross-sectional area of said space between said screen and said drum multiplied by the number of said inlets to said space.

9. Screening apparatus according to claim 1 wherein said screen is stationary and said at least one inlet comprises a slot in the screen extending substantially the full axial length of said screening zone.

10. Screening apparatus according to claim 1 wherein said pulse creating means comprises pins mounted on said rotor with enlarged heads adjacent said screen.

11. Screening apparatus according to claim 10 wherein said enlarged heads are generally hemispherical buttons.

12. Screening apparatus according to claim 1 wherein said space has a cross-sectional width of from about 1.5 to 2.5 inches.

13. Screening apparatus according to any of claims 1-10 wherein said screen surrounds said drum.

14. Screening apparatus according to claim 1 wherein said screen is stationary and surrounds said drum which is rotatable, there are two of said inlets and two of said rejects outlets spaced in alternation about the screen axis, with each inlet having an associated outlet spaced circumferentially of the screen from said inlet between about 3 feet and 4 feet, said inlets and said outlets each comprising a slot in the screen extending substantially the full axial length of said treating zone, each said outlet slot having a separate rejects receiving chamber on the outside of said screen associated therewith, and said discharge means for slurry passing the screen includes two accepts receiving chambers on the outside of the screen, one located between each said inlet slot and the rejects receiving chamber of its associated rejects outlet.

15. Screening apparatus according to claim 14 wherein said screen is disposed on a vertical axis and said accepts receiving chambers discharge to outlet means disposed above the screen.

16. Screening apparatus according to claim 14 wherein said feed means includes means for dividing a single flow of feed slurry into two streams and supplying such streams, respectively, to said respective inlets.

17. Screening apparatus according to claim 14 wherein said feed means includes means for supplying the feed slurry to said inlet means in a flow having a cross-sectional area approximately equal to four times the cross-sectional area of said space between said drum and said screen.

18. Screening apparatus according to claim 17 wherein said pulse forming means comprise pins attached to said drum having hemispherical buttons on their outer ends with close clearance from said screen.

19. Screening apparatus according to claim 17 wherein said drum is spaced about 1.5 to 2.5 inches from said screen.

* * * * *

UNITED STATES PATENT AND TRADEMARK OFFICE
CERTIFICATE OF CORRECTION

PATENT NO. : 4,318,805

DATED : March 9, 1982

INVENTOR(S) : Peter E. LeBlanc

It is certified that error appears in the above-identified patent and that said Letters Patent are hereby corrected as shown below:

Column 7, line 30, after "drum", insert a comma.

Signed and Sealed this

Eighteenth Day of May 1982

|SEAL|

Attest:

GERALD J. MOSSINGHOFF

Attesting Officer

Commissioner of Patents and Trademarks